March 22, 1927.
J. PEGUERO
1,621,896
APPARATUS FOR FORMING CAKES
Filed April 1, 1924
Fig.1,
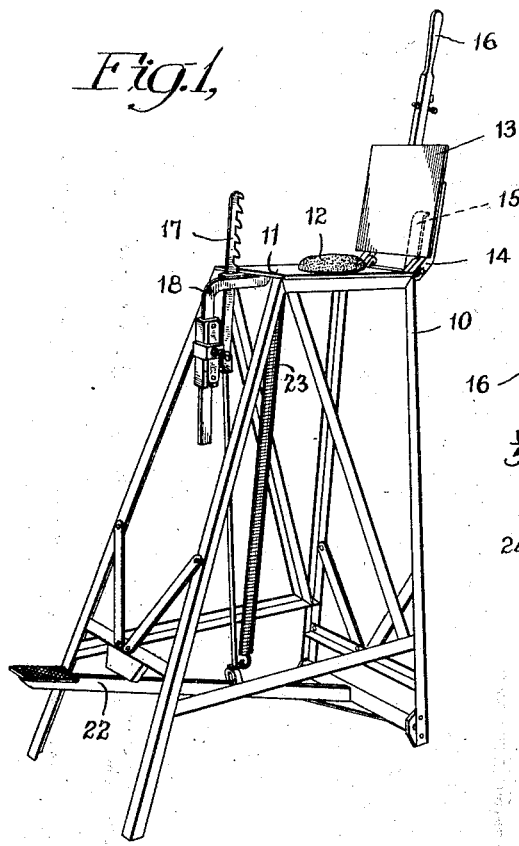
Fig.2,
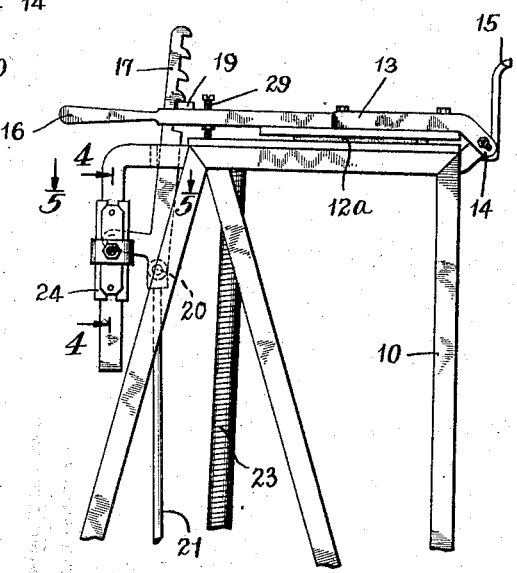
Fig.3,
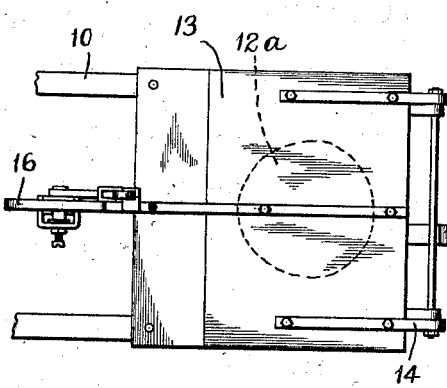
Fig.4, Fig.5,
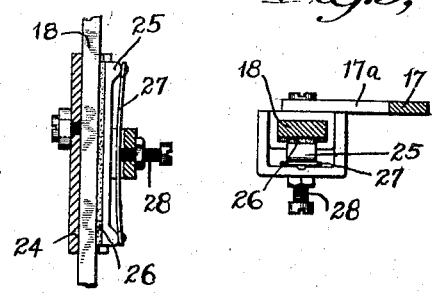
Inventor
Jose Peguero
By his Attorney Patented Mar. 22, 1927.

1,621,896

UNITED STATES PATENT OFFICE.

JOSÉ PEGUERO, OF PORT ARTHUR, TEXAS.

APPARATUS FOR FORMING CAKES.

Application filed April 1, 1924. Serial No. 703,347.

This invention relates to apparatus for fashioning cakes formed of plastic materials and has particular reference to the preparation of cakes formed of food products.

The primary object of my invention is to provide apparatus for pressing material into cakes and more particularly to form relatively thin flat cakes.

Another important object of my invention is to provide mechanism adapted to form cakes of uniform thickness and under uniform degrees of compression.

The invention has a particular field of usefulness in the preparation of the Mexican food product known as the tortilla. In the preparation of this product corn is boiled in lime water. The softened grain is then ground into a fine meal either by the more primitive method of grinding with stones or by more modern methods of grinding with suitable machinery. In common practice the moist meal as thus formed is then fashioned by hand into a flat circular cake after which it is baked. It requires considerable skill to properly fashion the cake and moreover the procedure is a slow and tedious one. My invention contemplates mechanism by which the cake may be formed in an efficient and expeditious manner.

The invention has particular reference to certain novel features of construction and arrangement of parts an example of which is given in this specification and illustrated in the accompanying drawings wherein:

Figure 1 is a view in perspective of an apparatus constructed in accordance with the invention and constituting an embodiment thereof.

Figure 2 is a partial view in side elevation.

Figure 3 is a plan view.

Figure 4 is a vertical section in detail on the line 4—4 of Figure 2.

Figure 5 is a horizontal section in detail on the line 5—5 of Figure 2.

The apparatus thus illustrated includes a table or stand 11 formed with supporting legs 10. The table carries a press member 13 arranged and adapted to be moved into position over the material 12 which is placed on top of the table and which it is desired to compress and fashion into a cake.

As shown in the drawings the press board 13 is supported on hinges 14 and is preferably equipped with a stop or rest 15. For the convenience of the operator a handle 16 is provided.

A movable element 17, preferably in the form of a bar or lever, is arranged and adapted to engage the press board 13 or handle 16 thereof when the press member has been moved into position over the material 12. The member 17 is shown as being slidably mounted in a guide bracket 18 and provided with a plurality of notches so that when it is moved downwardly it will engage the handle 16 or a nib or lug 19 carried by the handle. The slidable bar 17 has a flexible or pivotal connection at 20 with a link 21 arranged to connect the bar with a suitable source of power for actuating same and for exerting pressure on the press member 13. As shown in the drawing the link 21 is connected to a treadle 22 provided with spring-tensioning means 23.

The element 17 includes an arm or lug 17$^a$ by which the element is pivotally secured on a movable member 24 which is slidably mounted on a vertical leg of the bracket member 18. The slidable member 24 is preferably formed with a slot or opening within which is mounted a bar 25 the inner face 26 of which is formed of fibre board or similar material and which is adapted to frictionally engage the bracket member 18. Suitable resilient means, such as a spring bar 27, equipped with a set screw 28 for adjusting the tension thereof, is provided to maintain the friction means 26 in proper contact with the member 18. It is apparent that by means of the resilient means 27 the friction member 26 when properly tensioned enables the slidable member 24 to move up and down on the bracket member 18 without undue friction and yet without any lost motion.

In operating the apparatus with the press member 13 in position as shown in Figure 1 the material 12, which may consist of corn meal adapted for the preparation of tortillas, or other food product which it is desired to compress and form into a cake, is placed upon the table 11. The operator then swings the press member 13 into position over the material and depresses the treadle 22. The downward movement of the treadle causes the member 17 to move pivotally so as to engage the press member or lug 19 carried by said member. It will be observed that by reason of the plurality of notches in the member 17 and by reason of its pivotal movement the depression of the treadle will invariably result in the proper engagement of the member 17 with the nib 19 regardless of variations (within reasonable limits) in the height of the press member above the table 11 or in its angle of inclination therewith. It is, therefore, unnecessary that the lump of material 12 be of any particular thickness in order to obtain the uniform results desired. The depression of the treadle, after causing the member 17 to engage the press member, operates to exert the required amount of pressure on the material 12 so as to compress and flatten same into a cake 12ª as indicated in Figures 2 and 3. The press member or handle 16 thereof is preferably equipped with an adjusting screw 29 for limiting its downward movement so that the material 12 will not be compressed or flattened beyond the extent desired and so as to obtain cakes of uniform thickness. It is sometimes desirable to employ sheets of cloth, paper, or the like, to prevent the material 12 from adhering to the surfaces of the table and press member.

By employing the apparatus of my invention cakes of uniform thickness and degree of compression may be prepared in a rapid and efficient manner.

Apparatus of preferred form and construction has been illustrated and described for the purpose of showing a way in which this invention may be used, but the inventive thought upon which this application is based, is broader than these illustrative embodiments thereof, and I therefore intend no limitations other than those imposed by the appended claims.

What I claim is:

1. An apparatus for fashioning cakes formed of food products comprising a table upon which the material for the cake may be placed, a press board pivotally secured to said table and adapted to be moved into position over the material on the table, a vertically movable bar arranged and adapted to engage the press board, a slidable element adapted to move in a vertical plane and to which said bar is pivotally connected and means for actuating said bar having a pivotal connection therewith.

2. An apparatus for fashioning cakes formed of food products comprising a table upon which the material for the cake may be placed, a press board pivotally secured to said table and adapted to be moved into position over the material on the table, a vertically movable bar arranged and adapted to engage the press board, a bracket carried by the table and a slidable member adapted to frictionally engage said bracket and pivotally connected to said movable bar and means for actuating said bar.

3. An apparatus for fashioning cakes formed of food products comprising a table upon which the material for the cake may be placed, a press board pivotally secured to said table and adapted to be moved into position over the material on the table, a vertically movable bar formed with a plurality of notches so that when moved downwardly it may engage with the press board at varying elevations or inclinations thereof, a friction member pivotally connected to said movable bar, a bracket carried by the table upon which said friction member travels and means for actuating said movable bar having a pivotal connection therewith.

In witness whereof I have hereunto set my hand this 25th day of February 1924.

JOSÉ PEGUERO.